(12) United States Patent
Sarh

(10) Patent No.: US 7,076,856 B2
(45) Date of Patent: Jul. 18, 2006

(54) ADJUSTABLE SYSTEM AND METHOD FOR SUPPORTING AND JOINING STRUCTURAL MEMBERS

(75) Inventor: Branko Sarh, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 442 days.

(21) Appl. No.: 10/294,973

(22) Filed: Nov. 14, 2002

(65) Prior Publication Data

US 2004/0093731 A1    May 20, 2004

(51) Int. Cl.
*B21D 39/00* (2006.01)
*B23P 19/00* (2006.01)

(52) U.S. Cl. .............. 29/524.1; 29/525.06; 29/715; 29/796

(58) Field of Classification Search ............ 29/524.1, 29/525.06, 34 B, 715, 796, 778, 788; 403/381, 403/363
See application file for complete search history.

(56) References Cited

U.S. PATENT DOCUMENTS

| | | | | | |
|---|---|---|---|---|---|
| 3,534,896 | A | * | 10/1970 | Krynytzky et al. | ........... 227/51 |
| 5,163,793 | A | * | 11/1992 | Martinez | ............... 409/205 |
| 5,341,556 | A | * | 8/1994 | Shubin et al. | ............... 29/448 |
| 5,364,083 | A | * | 11/1994 | Ross et al. | ............... 269/21 |
| 5,457,868 | A | * | 10/1995 | Blaimschein | ............... 29/559 |
| 5,615,474 | A | * | 4/1997 | Kellner et al. | ............... 29/703 |
| 6,029,352 | A | * | 2/2000 | Nelson | ............... 29/897.2 |
| 6,088,897 | A | * | 7/2000 | Banks et al. | ............. 29/243.53 |
| 6,125,607 | A | * | 10/2000 | Poce | ............ 52/730.7 |
| 6,129,031 | A | * | 10/2000 | Sarh et al. | ............. 112/470.13 |
| 6,413,022 | B1 | | 7/2002 | Sarh | |
| 6,418,602 | B1 | * | 7/2002 | Crocker et al. | ............. 29/281.4 |
| 6,478,722 | B1 | * | 11/2002 | Graham et al. | ............... 483/28 |
| 6,585,448 | B1 | * | 7/2003 | Grossman et al. | ........... 403/403 |

OTHER PUBLICATIONS

Machinery for the Aerospace Industry; Product Catalogue; Nov. 14, 2002; 38 pgs, available at http://www.mtorres.es/ingles/ia.

* cited by examiner

*Primary Examiner*—Marc Jimenez
(74) *Attorney, Agent, or Firm*—Alston & Bird LLP

(57) ABSTRACT

An apparatus and associated method for joining structural members are provided. The apparatus includes a support structure of extendable members, each with an adjustable support surface for engaging the structural members so that structural members of different sizes and shapes can be accommodated. Gantries, which are longitudinally adjustable, support a joining device having co-operable heads that engage the structural members. The heads are adjustable in a transverse direction along the gantries so that the heads can be configured in an opposing configuration and used to join the structural members therebetween.

28 Claims, 5 Drawing Sheets

ADJUSTABLE SYSTEM AND METHOD FOR SUPPORTING AND JOINING STRUCTURAL MEMBERS

BACKGROUND OF THE INVENTION

1) Field of the Invention

The present invention relates to the joining of structural members and, more particularly, to a system and method for adjustably supporting and joining structural members using heads adjustably mounted on gantries.

2) Description of Related Art

Certain structural parts have conventionally been manufactured by joining a number of preformed structural members. For example, in the aircraft industry, wings are often manufactured by forming, and then joining, one or more skins and stringers. The skins, which are typically large and thin, form the outer contoured airfoil of the wing, and the stringers are joined to the skin to strengthen and stiffen the skins. According to one conventional manufacturing process, the skins and stringers are assembled in place in specially shaped fixtures and clamped therein with straps, which hold the skins and stringers in a desired configuration. Holes are then drilled through the skins and stringers, and some or all of the members are then removed from the fixture so that the holes can be deburred and metal chips or other debris can be removed from between the members. Sealant is then typically applied to the stringers, the members are again positioned in the fixtures, and temporary fasteners are installed to join the members. The assembled members are then brought to a workstation where operators remove the temporary fasteners and install permanent fasteners.

According to this conventional method, the structural members typically must be moved several times during assembly. For example, if the skins and/or stringers are not removed from the fixtures for cleaning after the holes are drilled, debris introduced between the members during drilling can damage the parts or impair the effectiveness of the joint and the finished wing. Thus, the process is time-consuming and labor intensive. Further, the fixtures, which must be shaped according to the particular members that are to be joined, add to the cost of manufacture. Additionally, sufficient factory space is required for moving and processing the members, and special equipment may be required for moving the members if they are large, heavy, or subject to being damaged.

For small structural members, the holes can sometimes be drilled before the members are assembled in the fixture, e.g., during the manufacture of the individual members. However, for members that are large, complex, or formed of certain materials, it can be difficult or impossible to predict the precise placement of the holes. For example, for long skins and stringers, thermal expansion or contraction of the members may be nonuniform throughout each member or between different members. If the holes are formed during manufacture of the members, the corresponding holes of the different members may not properly align during assembly. Therefore, the fixtures are used to align the members while the holes are formed.

Thus, there exists a need for an apparatus and method for joining structural members, including members that are large, heavy, complex, or made of various materials, for example, aluminum skins and stringers that are joined to form long aircraft wings. The apparatus should be adaptable for use with different structural members and preferably should not require an undue amount of factory space. Also, the method should not require excessive time or effort for joining the structural members.

BRIEF SUMMARY OF THE INVENTION

The present invention meets these and other needs by providing an apparatus and associated method for joining structural members, including large, heavy, and complex members formed of various materials. The apparatus includes a support structure of extendable members, each with an adjustable support surface for engaging the structural members so that structural members of different sizes and shapes can be accommodated. Gantries, which are longitudinally adjustable, support a joining device having co-operable heads that engage the structural members. The heads are adjustable in a transverse direction along the gantries so that the heads can be configured in an opposing configuration and used to join the structural members therebetween. The structural members can be arranged and joined on the same apparatus, thus minimizing the factory space and time required for assembly.

According to one embodiment of the present invention, each gantry has first and second support beams extending proximate to the support structure. The first support beams support first and second heads, respectively. The second support beam can be adjustable through a range of motion that intersects the extendable members in an extended position. The extendable members can also be transversely adjustable and can include suction cups or rigid stops for engaging the structural members. The extendable members can be connected to a source of pressurized gas or a vacuum device and configured to direct a flow of gas toward the structural members to decrease a frictional force between the structural members and the extendable members or to evacuate air from between the extendable members and the structural members and thereby increase a frictional force therebetween.

The heads of the joining device can be configured to extend toward the structural members so that the heads engage the structural members at opposing positions, and the heads can be configured to rotate relative to the gantry. The joining device can include a rivet installation device for positioning rivets in rivet apertures of the structural members and upsetting the rivets to join the structural members. The joining device can also include a drill for forming the rivet apertures. One or both of the heads can include detection devices for locating a portion of the structural members.

The present invention also provides a method of joining at least one structural member in a desired configuration. The method includes extendably adjusting a plurality of extendable members so that a support surface of each extendable member corresponds to and supports the structural members. A gantry is adjusted in a longitudinal direction of the structural members such that first and second beams of the gantry are disposed in an opposing configuration with the structural members therebetween. A first joining head is adjusted in a transverse direction along the first beam, and a second joining head is adjusted in a transverse direction along the second beam. At least one of the heads is extended toward the structural members to engage the members between the heads, and the heads are actuated to join the members, for example, by positioning a rivet in a rivet aperture defined by the structural members and upsetting the rivet. The heads can also be used to drill the rivet apertures.

According to one aspect of the invention, a flow of gas can be directed from the extendable members toward the at least one structural member to decrease a frictional force between the extendable members and the structural members and thereby facilitate an adjustment of the at least one structural member relative to the extendable members. The extendable members can also be engaged to the structural members by evacuating a gas from therebetween, and increasing the frictional force.

According to another aspect of the invention, a plurality of pads are formed on a first of the structural members, each pad extending therefrom, and a plurality of corresponding elongate pockets are formed in a second structural member. The pockets are elongate in a longitudinal direction of the structural members so that the pockets provide a longitudinal range of alignment with the pads of the first structural member. The second structural member is then positioned relative to the first structural member so that the pockets correspond to the respective pads.

BRIEF DESCRIPTION OF THE SEVERAL VIEWS OF THE DRAWINGS

Figure 1A:
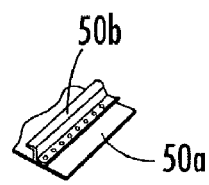
Figure 1:
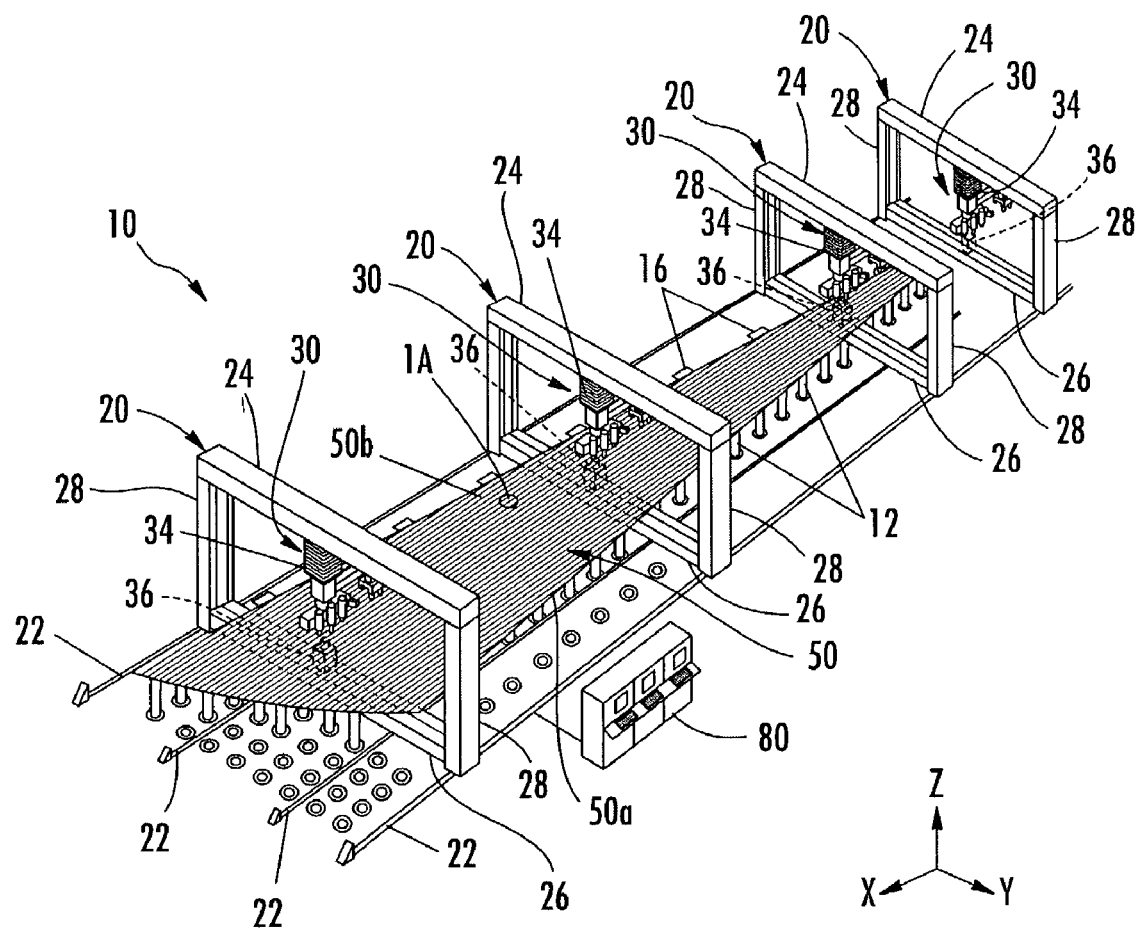
Figure 3:
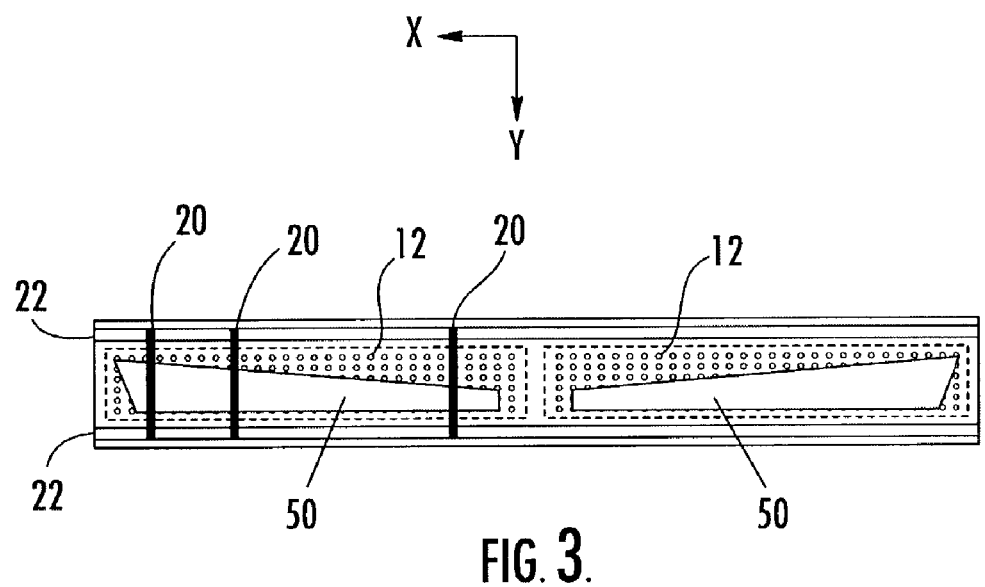
Figure 2:
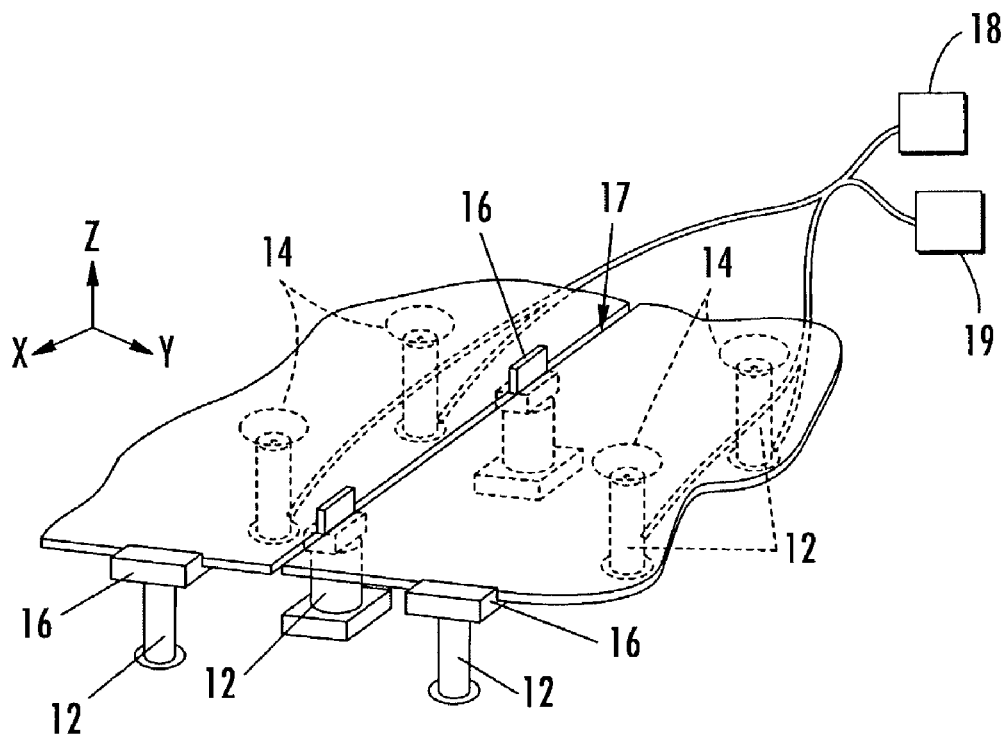
Figure 4:
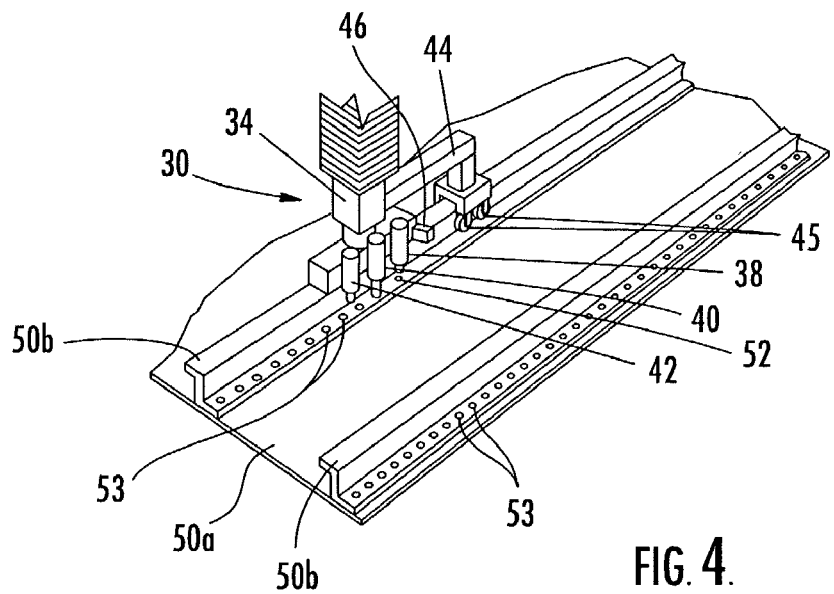
Figure 5:
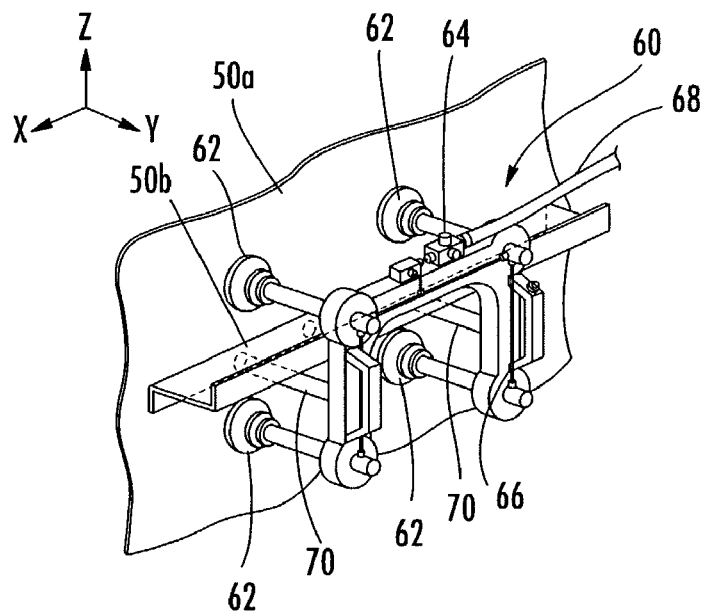
Figure 6:
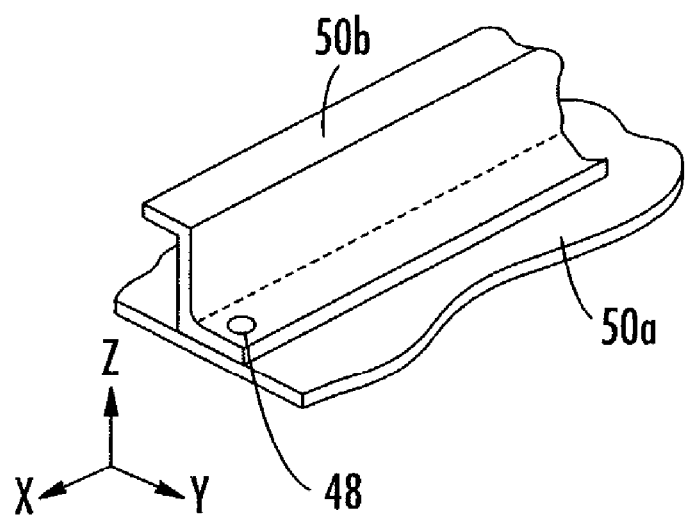
Figure 7:
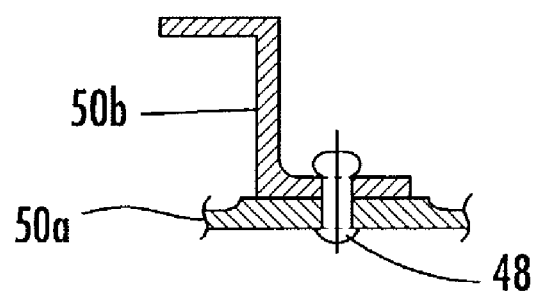
Figure 8:
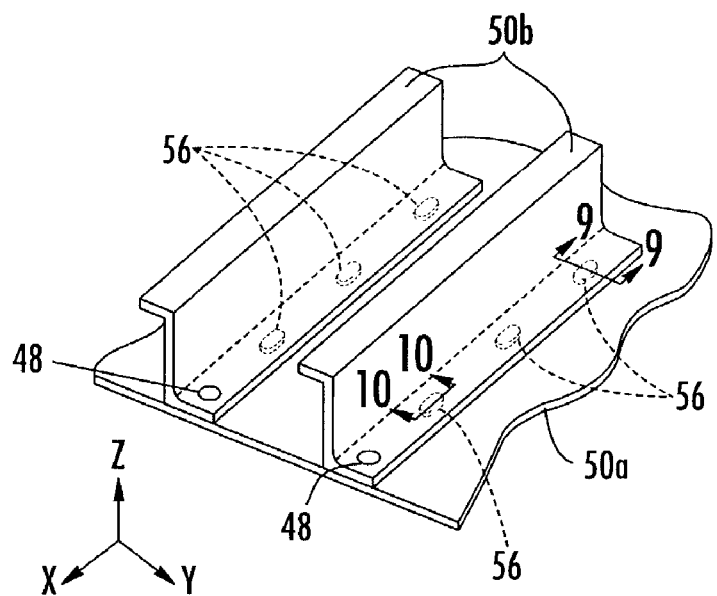
Figure 9:
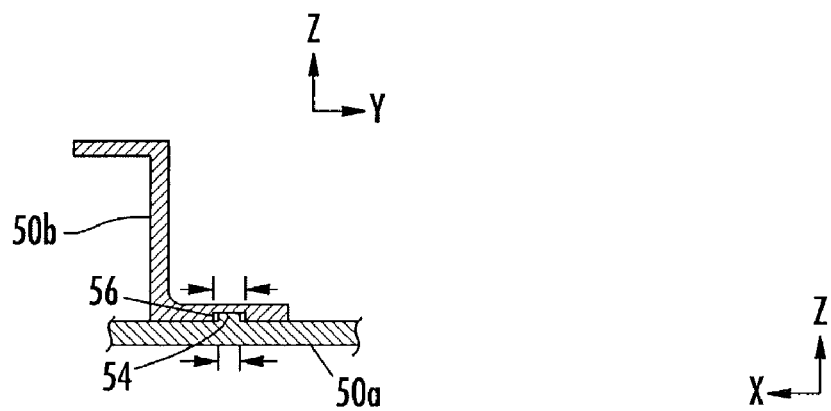
Figure 10:
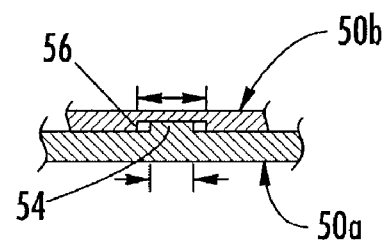

Having thus described the invention in general terms, reference will now be made to the accompanying drawings, which are not necessarily drawn to scale, and wherein:

FIG. 1 is a perspective view of a joining apparatus for joining structural members according to one embodiment of the present invention;

FIG. 1A is a detail view of the structural members of FIG. 1, as indicated by reference line 1A of FIG. 1;

FIG. 2 is a perspective view of two structural members supported by pogos according to another embodiment of the present invention;

FIG. 3 is a plan view of a joining apparatus according to another embodiment of the present invention;

FIG. 4 is a partial perspective view of the first head of the apparatus of FIG. 1;

FIG. 5 is a vacuum clamping device used to hold two structural members in a desired configuration for joining according to the present invention;

FIG. 6 is a partial perspective view of a stringer and skin joined by a coordination fastener according to one embodiment of the present invention;

FIG. 7 is a section view of the stringer and skin of FIG. 6;

FIG. 8 is a perspective view of a skin and two stringers having a plurality of pads and pockets for aligning the members according to another embodiment of the present invention;

FIG. 9 is a section view of the skin and stringer of FIG. 8 as seen along line 9—9 of FIG. 8; and FIG. 10 is a section view of the skin and stringer of FIG. 8 as seen along line 10—10 of FIG. 8.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Referring now to the figures and, in particular, to FIG. 1, there is shown an apparatus 10 for joining structural members referred to collectively by the reference numeral 50, according to one embodiment of the present invention. The joining apparatus 10 can be used to join any number of structural members 50, and the structural members 50 can be formed of a variety of materials such as aluminum, titanium, steel, alloys, polymers, composites, and the like. According to one embodiment of the present invention, the structural members 50, include aluminum parts that are joined to form a portion of an aeronautical vehicle. For example, as shown in FIG. 1A, the structural members 50 can include one or more generally flat skins 50a and beam-like stringers 50b. Further, as described below, the joining apparatus 10 is capable of accommodating structural members 50 of different materials, shapes, and sizes. Each joint can comprise a rivet, bolt, screw, weld, adhesive joint, and the like.

In the embodiment illustrated in FIG. 1, the apparatus 10 includes a plurality of extendable members. For the purpose of illustration, there are shown in the figures extendable members known as pogos 12, but other types of extendable members can similarly be used. The pogos 12 are extendable from a reference surface, which is horizontal, in the X-Y plane of FIG. 1, but the reference surface can also be disposed at other configurations. The arrangement and number of the pogos 12 can be predetermined according to the configuration of the structural members 50 that are to be joined with the apparatus 10. The pogos 12 can be individually adjusted, i.e., by extending or retracting relative to the reference surface, such that the pogos 12 correspond to the shape of the structural members. The pogos 12 can be adjusted by actuators, such as electric, pneumatic, or hydraulic actuation devices, as are known in the art.

Each of the pogos 12 defines a support surface for engaging the structural members. The support surface can be formed of a soft or elastic material such as various types of polymers. For example, as shown in FIG. 2, flexible plastic suction cups 14 can be provided on the pogos 12 for supporting and gripping the multiple portions of the structural members 50. Further, some or all of the pogos 12 can be fluidly connected to a pressurized fluid source 18 that provides a fluid, such as air, to the pogos 12. The pogos 12 can direct a flow of the pressurized fluid toward the structural members 50, thereby reducing the frictional force between the structural members 50 and the pogos 12 and facilitating the positioning of the structural members 50 on the pogos 12. Similarly, the pogos 12 can be fluidly connected to a vacuum device 19 configured to evacuate the ambient gas, e.g., air, from between the structural members 50 and the pogos 12, thereby increasing a frictional force between the pogos 12 and the structural members 50 to secure the structural members 50 in place against the pogos 12. Thus, air can be directed from the pogos 12 toward the structural members 50 as the structural members 50 are positioned on the pogos 12 manually by an operator or in an automated fashion. Then, when the structural members 50 are positioned in the desired configuration, the pogos 12 can be used to evacuate the air and secure the structural members 50 against the pogos 12.

As also illustrated in FIG. 2, some of the support surfaces of the pogos 12 define a rigid support surface or stop 16 for securing an edge, corner, or other portion of the structural members 50 at a particular location. Preferably, at least some of the pogos 12, for example, the pogos 12 with the stops 16, are adjustable in a transverse direction, i.e., perpendicular to the direction of extension and retraction. Thus, the pogos 12 can be further configured to accommodate different structural members and secure the structural members in a predetermined configuration. The stops 16 can be flat or curved to correspond to the structural members 50 and can define one or more corners or steps for engaging one or more edges of the structural members 50. For example, the stops 16 can extend between the structural members 50 to maintain a desired gap 17 therebetween as shown in FIG. 2. Further, the support surfaces of the pogos 12 can be replaceable so that each pogo 12 can be made to provide any of a number of types of support surfaces.

The apparatus 10 also includes at least one adjustable gantry 20 for joining the structural members 50. The gantries 20 are adjustable in a longitudinal direction of the apparatus 10, i.e., in the direction of the X-axis as shown in FIG. 1, so that each gantry 20 can be positioned to join the structural members 50 at different locations. For example, the gantries 20 can be slidably mounted on longitudinally extending tracks 22, and an actuator (not shown) such as an electric motor can be provided for moving the gantries 20 along the tracks 22. Each gantry 20 includes first and second support beams 24, 26, which are connected, for example, by perpendicular portions 28 as shown in FIG. 1. The first and second beams 24, 26 are configured so that, when the structural members 50 are positioned on the pogos 12, the beams 24, 26 are positioned on opposing sides of the structural members 50. The range of motion of the second beam 26, due to the longitudinal adjustment of the gantry 20, extends through the extended pogos 12. Therefore, the pogos 12 are configured to be retracted as each gantry 20 is adjusted so that the gantry 20 passes without contacting the pogos 12.

Multiple gantries 20 can be provided so that each gantry 20 can form some of the joints, thus increasing the speed at which the structural members 50 are joined. For example, each gantry 20 can form joints in a predetermined zone or section of the structural members 50, though preferably each of the gantries 20 can adjust to at least one longitudinal end of the apparatus 10 to facilitate the loading of the structural members 50 onto the pogos 12. Further, the gantries 20 can be adjustable over a group of pogos 12 that is large enough to support multiple arrangements of structural members 50, as shown in FIG. 3. Thus, the gantries 20 can be adjusted proximate to a first arrangement of structural members 50 to thereby join the structural members 50 while a second arrangement of structural members 50 is loaded or unloaded from the pogos 12 or otherwise processed.

Each gantry 20 includes a joining device 30 that has first and second co-operable heads 34, 36, each of which are connected to the respective support beams 24, 26. The heads 34, 36 are adjustable in a transverse direction along the gantry 20, i.e., in a direction generally perpendicular to the longitudinal direction of adjustment of the gantries 20. Thus, by adjusting one or both of a respective gantry 20 and the heads 34, 36, the heads 34, 36 can be adjusted throughout a range of motion to access the portions of the structural members 50 that are to be joined. The first and second heads 34, 36 of each gantry 20 can be adjusted in unison so that the heads 34, 36 are in an opposing relationship for cooperable joining. Preferably, at least one of the heads 34, 36 can be extended or retracted relative to the gantry 20 so that the heads 34, 36 can be adjusted against the structural members 50 and can urge the structural members 50 together during joining. By urging the structural members 50 together during joining, for example, while holes are formed in the members 50, the joining device 30 can prevent metal shavings, chips, or other debris from entering and becoming caught between the members 50. Each of the heads 34, 36 can include a variety of joining equipment such as drills, fastener placement devices, fastener actuation devices, welders, alignment devices, and the like.

In FIG. 4, there are shown multiple structural members 50 including one skin 50a that is supported by pogos (not shown in FIG. 4) and two stringers 50b that are supported by the skin 50a. The skin 50a and stringers 50b can be used, for example, in the construction of a wing for an aircraft, the skin 50a being the outer layer of the wing and the stringers 50b being internal stiffeners of the wing. The stringers 50b are configured for being joined to the skin 50a by the first head 34, which includes a drill 38 for drilling apertures 52 in the structural members, a placement device 40 for placing rivets 53 in the apertures 52, and an actuation device 42 for upsetting the rivets 53. The first head 34 can be adjusted along each of the stringers 50b by adjusting the head 34 relative to the gantry 20 and/or adjusting the gantry 20 relative to the structural members 50. As the first head 34 is adjusted along each stringer 50b, the drill 38 forms one of the apertures 52 extending through the stringer 50b and the skin 50a. The placement device 40 positions one of the rivets 53 in the aperture 52, and the actuation device 42 upsets the rivet 53 to thereby join the stringer 50b to the skin 50a. A guide 44 is attached to the first head 34 for aligning the stringers 50b along the skin 50a. The guide 44 extends from the first head 34 in the longitudinal direction of the apparatus 10, and is configured to engage the structural members 50 to align the structural member 50 during joining. For example, the guide 44 can correspond in size and shape to the particular stringer being attached and can include rollers 45 or sliders that contact the structural members 50. Preferably, the guide 44 is adjustable or replaceable so that stringers of different sizes or shapes can be accommodated. Additionally, the guide 44 can be rigidly attached to the head 34 so that rotation or other adjustment of the head 34 also adjusts the guide 44, such that the head 34 can be used to adjust the guide 44 and thereby control the alignment of the structural members 50. Alternatively, one or more hinges or other joint devices (not shown) can connect the guide 44 to the head 34 and actuation devices such as motors or can provided for adjusting the guide 44 relative to the head 34.

Although not shown in FIG. 4, the second head 36 is similarly adjusted so that the second head 36 is in an opposing relationship to the first head 34. The second head 36 can also include multiple devices for cooperably joining the members 50. For example, the second head 36 can include an anvil that defines bores or apertures for receiving the drill 38 and the rivets 53 through the structural members 50 and a surface for resisting the force exerted by the actuation device 42 while upsetting the rivets 53. The second head 36 can also include devices similar to those of the first head 34 for drilling, placing fasteners, and actuating the fasteners.

Further, the first and second heads 34, 36 can also include a detection device 46 for locating particular portions of the structural members 50. For example, the detection device 46 can include a laser or other optical device for detecting a desired location for joining, detecting the apertures 52, detecting defects or other attributes of the structural members, and the like.

Each of the heads 34, 36 can also be configured to rotate relative to the gantry 20, i.e., so that one or both of the heads 34, 36 can be rotated relative to the direction of extension of the pogos 12. Thus, the heads 34, 36 can be rotated to an angle relative to the pogos 12 and, hence, the structural members 50, to join the structural members 50 at any desired angle. For example, if the skin 50a extends generally horizontally and also includes a vertical surface, the heads 34, 36 can be rotated to dispose the rivets 53 horizontally and thereby horizontally join one of the stringers 50b to the vertical surface of the skin 50a. A vacuum clamp 60 can be used to hold and/or fasten the stringer 50b in place before or during joining by the heads 34, 36. For example, FIG. 5 illustrates a vacuum clamp 60 positioned to hold the stringer 50b against a surface of the skin 50a that extends generally in the direction of extension of the pogos 12. The vacuum clamp 60 includes suction cups 62 which are fluidly connected to a vacuum generator 64 by vacuum lines 66. The vacuum generator 64 is connected by an air pressure line 68 to a pressure source (not shown) and generates a vacuum for engaging the suction cups 62 against the skin 50a. Clamping pins 70 urge the stringer 50b against the skin 50a, thereby holding the structural members 50a, 50b in the desired configuration. Vacuum clamps 60 are further described in U.S. Pat. No. 6,413,022, titled "Vacuum Clamp Device," which is assigned to the assignee of the present application and the entirety of which is incorporated herein by reference.

During operation according to one embodiment of the present invention, the structural members 50 are configured in a desired configuration and positioned on the pogos 12. At least one gantry 20 is adjusted longitudinally and the heads 34, 36 are adjusted transversely so that the heads 34, 36 are positioned to join the structural members 50 at a desired location. The positions of the heads 34, 36 are then similarly adjusted according to the positions of other desired locations of joining, and the joining is performed. A coordination fastener 48, shown in FIGS. 6 and 7, can be installed before the heads 34, 36 are used to form any other joints so that the coordination fastener 48 prevents the structural members 50 from translating relative to one another. The coordination fastener 48 can allow some rotational adjustment of the structural members 50 relative to one another, i.e., about the Z-axis as shown in FIG. 6. If a coordination fastener 48 is used, the heads 34, 36 can be adjusted to align the structural members 50, for example, using the guide 44, so that the structural members 50 are positioned relative to one another and maintained in the correct position as the heads 34, 36 join the structural members 50. The alignment of the structural members 50 can also be facilitated by alignment features on one or more of the structural members 50. For example, as shown in FIGS. 8–10, a plurality of pads 54 can be provided on one of the structural members 50, such as the skin 50a, so that each of the pads 54 extends from the surface of the skin 50a to engage another structural member 50, such as a stringer 50b. The pads 54 can be formed as integral portions of the structural member 50, for example, by stamping or machining the structural member 50 to form the pads 54. The pads 54 can also be formed during the formation of the structural member 50 or by molding the structural member 50. For example, uncured composite material, such as resin-impregnated fibers, can be arranged on a tool that defines the pad shapes and cured to form the structural member 50 having the pads 54. Structural members 50 formed of composite materials or other moldable materials can also be molded, for example, by applying heat and pressure to form the pads 54. Alternatively, the pads 54 can be formed separately from the structural member 50 and attached thereto by weld joints, fasteners, adhesives, and the like.

Pockets 56 can be provided in the stringer 50b to correspond with the pads 54 of the skin 50a. The pockets 56 can be depressions in, or bores through, the stringer 50b. The pockets 56 can be formed by drilling, machining, stamping, molding, and the like. For example, the pockets 56 can be formed by curing composite materials on a tool that defines the pocket shapes, as described above in connection with the pads 54. Preferably, each pocket 56 is elongate, for example, in a longitudinal direction of the structural members 50, so that the pockets 56 provide a longitudinal range of alignment with the pads 54 of the skin 50a. Thus, the stringer 50b can be positioned relative to the skin 50a so that the elongate pockets 56 of the stringer 50b correspond to the respective pads 54 of the skin 50a, as shown in FIG. 8, and the coordination fastener 48 can be installed to prevent translation of the members 50. As illustrated in FIG. 9, the elongate pockets 56 correspond closely to the pads 54 in the transverse dimension, the Y-direction in FIG. 9, so that the pads 54 and pockets 56 maintain the structural members 50 in close alignment. However, as shown in FIG. 10, the pockets 56 correspond less closely to the pads 54 in the longitudinal direction, the X-direction as shown in FIG. 10, to provide a longitudinal range of alignment. Thus, even if the center of each pad 54 does not correspond to the center of each pocket 56, the pockets 56 and pads 54 can still be engaged to align the structural members 50 and maintain the relative positions of the structural members 50 during joining by the apparatus 10. For example, if the skin 50a and stringer 50b are thermally expanded or contracted nonuniformly, the pockets 56 can receive the pads 54 even if the centers of the pads 54 and pockets 56 do not correspond to one another in the longitudinal direction. Although the skin 50a and stringer 50b are described above, the pockets 56 and pads 54 can similarly be provided on any structural members 50 to facilitate alignment.

The pockets 56 can be approximately uniform in length, for example, about twice as long as each pad 54 in the X-direction. Alternatively, the length of each pocket 56 can be determined according to the distance of each pocket 56 from the ends of the structural member 50 or the coordination fastener 48. The length of the pockets 56 can vary linearly according to the distance between each pocket 56 and the coordination fastener 48 so that pockets 56 that are farther from the coordination fastener 48 and, hence, more affected in position by thermal expansion or contraction of the structural member 50 are larger. For example, pockets 56 located within two feet of the coordination fastener 48 can be about 0.1 inch longer in the X-direction than the corresponding pad 54, and pockets 56 that are located 100 feet from the coordination fastener 48 can be about 0.5 inch longer than the corresponding pad 54. The relationship between the length of each pocket 56 and the distance of each pocket 56 from the end of the structural member 50 or the coordination fastener 48 can alternatively be non-linear, for example, to approximate a relationship between the distance in the X-direction between the pocket 56 and the end of the structural member 50 or the coordination fastener 48 and a change in position of the pocket 56 in the X-direction due to thermal effects.

As shown in FIG. 1, a controller 80 can be provided for adjusting the pogos 12, gantries 20, and/or heads 34, 36. The controller 80 can be automated or manually controlled by an operator. For example, a list of instructions or data regarding the shape and size of the structural members 50 and the placement and type of joining or fastening devices can be communicated to the controller 80, and the controller 80 can automatically adjust the apparatus 10 accordingly. The controller 80 can also be configured to adjust the apparatus 10 according to input received from one or more detection devices that detect characteristics of the structural members 50. Further, the controller 80 can be connected to a memory device so that the configuration of the pogos 12, gantries 20, and/or heads 34, 36 can be stored and recalled for subsequent processing of other structural members.

Many modifications and other embodiments of the inventions set forth herein will come to mind to one skilled in the art to which these inventions pertain having the benefit of the teachings presented in the foregoing descriptions and the associated drawings. For example, while the foregoing discussion illustrates the use of rivets for joining the structural members, the heads of the joining device can also be used to weld the structural members, dispose other fasteners such as bolts, screws, and adhesives, or otherwise join the structural members. Additionally, while either head can include one or more guides for aligning the structural members during joining, it is understood that the guide can be used in addition to or instead of the pockets and pads, which also assist in aligning the structural members. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of joining at least one structural member in a desired configuration, the method comprising:

forming a plurality of pads extending from a first structural member;

forming a plurality of elongate pockets in a second structural member to correspond with the pads of the first structural member, the elongate pockets being elongate relative to the pads of the first structural member in a longitudinal direction of the structural members such that the elongate pockets provide a longitudinal range of alignment with the pads;

positioning the second structural member relative to the first structural member such that the elongate pockets of the second structural member correspond to respective pads of the first structural member;

extendably adjusting a plurality of extendable members such that a support surface of each extendable member corresponds to and supports the at least one structural member;

sequentially retracting the extendable members and adjusting a gantry in a longitudinal direction of the at least one structural member such that first and second beams of the gantry are disposed in an opposing configuration with the at least one structural member therebetween and the second beam is adjusted through a range of motion that intersects the extendable members in an extended position;

adjusting a first joining head in a transverse direction along the first beam and a second joining head in a transverse direction along the second beam;

extending at least one of the heads toward the at least one structural member to engage the at least one structural member between the heads; and actuating at least one of the heads to join the at least one structural member.

2. A method according to claim 1 further comprising directing a flow of gas from the extendable members toward the at least one structural member to decrease a friction force between the extendable members and the at least one structural member and thereby facilitating an adjustment of the at least one structural member relative to the extendable members.

3. A method according to claim 1 further comprising engaging the extendable members with the at least one structural member and evacuating a gas from therebetween to thereby increase a friction force therebetween.

4. A method according to claim 1 further comprising extending each of the first and second heads toward the at least one structural member such that the heads engage the at least one structural member at opposing positions.

5. A method according to claim 1 wherein said actuating step comprises positioning a rivet in a rivet aperture defined by the at least one structural member and upsetting the rivet.

6. A method according to claim 5 wherein said actuating step further comprises using at least one of the heads to drill the rivet aperture in the at least one structural member.

7. A method according to claim 1 further comprising rotating at least one of the first and second heads relative to the gantry to engage the at least one structural member between the heads.

8. A method according to claim 1 further comprising using a detection device to locate a portion of the at least one structural member.

9. A method according to claim 1 further comprising engaging a guide to at least one of the structural members and adjusting the guide to align the structural members.

10. A method of joining at least one structural member in a desired configuration, the method comprising:

forming a plurality of pads extending from a first structural member;

forming a plurality of elongate pockets in a second structural member to correspond with the pads of the first structural member, each elongate pocket defining a length in a longitudinal direction of the structural members and extending along only a portion of the second structural member, the elongate pockets being elongate relative to the pads of the first structural member in a longitudinal direction of the structural members such that the elongate pockets provide a limited longitudinal range of alignment with the pads;

positioning the second structural member relative to the first structural member such that the elongate pockets of the second structural member correspond to respective pads of the first structural member;

extendably adjusting a plurality of extendable members such that a support surface of each extendable member corresponds to and supports the structural members;

adjusting a gantry in a longitudinal direction of the structural members such that first and second beams of the gantry are disposed in an opposing configuration with the structural members therebetween;

adjusting a first joining head in a transverse direction along the first beam and a second joining head in a transverse direction along the second beam;

extending at least one of the heads toward the structural members to engage the structural members between the heads; and actuating at least one of the heads to join the structural members.

11. A method according to claim 10 further comprising directing a flow of gas from the extendable members toward the structural members to decrease a friction force between the extendable members and the structural members and thereby facilitating an adjustment of the structural members relative to the extendable members.

12. A method according to claim 10 further comprising engaging the extendable members with the structural members and evacuating a gas from therebetween to thereby increase a friction force therebetween.

13. A method according to claim 10 further comprising extending each of the first and second heads toward the structural members such that the heads engage the structural members at opposing positions.

14. A method according to claim 10 wherein said actuating step comprises positioning a rivet in a rivet aperture defined by the structural members and upsetting the rivet.

15. A method according to claim 14 wherein said actuating step further comprises using at least one of the heads to drill the rivet aperture in the structural members.

16. A method according to claim 10 further comprising rotating at least one of the first and second heads relative to the gantry to engage the structural members between the heads.

17. A method according to claim 10 further comprising using a detection device to locate a portion of the structural members.

18. A method according to claim 10 further comprising engaging a guide to at least one of the structural members and adjusting the guide to align the structural members.

19. A method of joining at least one structural member in a desired configuration, the method comprising:
   forming a plurality of pads extending from a first structural member;
   forming a plurality of elongate pockets in a second structural member to correspond with the pads of the first structural member, the elongate pockets being elongate relative to the pads of the first structural member in a longitudinal direction of the structural members such that the elongate pockets provide a longitudinal range of alignment with the pads;
   positioning the second structural member relative to the first structural member such that the elongate pockets of the second structural member correspond to respective pads of the first structural member;
   extendably adjusting a plurality of extendable members such that a support surface of each extendable member corresponds to and supports the at least one structural member;
   adjusting a gantry in a longitudinal direction of the at least one structural member such that first and second horizontal beams of the gantry are disposed in an opposing configuration with the first beam above the at least one structural member and the second beam below the at least one structural member;
   adjusting a first joining head in a horizontal transverse direction along the first beam and a second joining head in a horizontal transverse direction along the second beam;
   extending at least one of the heads toward the at least one structural member to engage the at least one structural member between the heads; and
   actuating at least one of the heads to join the at least one structural member.

20. A method according to claim 19 further comprising directing a flow of gas from the extendable members toward the at least one structural member to decrease a friction force between the extendable members and the at least one structural member and thereby facilitating an adjustment of the at least one structural member relative to the extendable members.

21. A method according to claim 19 further comprising engaging the extendable members with the at least one structural member and evacuating a gas from therebetween to thereby increase a friction force therebetween.

22. A method according to claim 19 further comprising extending each of the first and second heads toward the at least one structural member such that the heads engage the at least one structural member at opposing positions.

23. A method according to claim 19 wherein said actuating step comprises positioning a rivet in a rivet aperture defined by the at least one structural member and upsetting the rivet.

24. A method according to claim 19 wherein said actuating step further comprises using at least one of the heads to drill the rivet aperture in the at least one structural member.

25. A method according to claim 19 further comprising rotating at least one of the first and second heads relative to the gantry to engage the at least one structural member between the heads.

26. A method according to claim 19 further comprising using a detection device to locate a portion of the at least one structural member.

27. A method according to claim 19 further comprising sequentially retracting the extendable members and adjusting the gantry such that the second beam is adjusted through a range of motion that intersects the extendable members in an extended position.

28. A method according to claim 19 further comprising engaging a guide to at least one of the structural members and adjusting the guide to align the structural members.

* * * * *